United States Patent [19]

Ashida

[11] 4,407,463

[45] Oct. 4, 1983

[54] TAPE RECORDING REPRODUCING APPARATUS HAVING IMPROVED FAST FORWARD DRIVE SYSTEM

[75] Inventor: Kazutaka Ashida, Yokohama, Japan

[73] Assignee: Victor Company of Japan, Limited, Yokohama, Japan

[21] Appl. No.: 295,001

[22] Filed: Aug. 21, 1981

[30] Foreign Application Priority Data

Aug. 22, 1980 [JP] Japan .................. 55-115376

[51] Int. Cl.³ .................. G11B 15/32; G11B 15/46
[52] U.S. Cl. .................. 242/201; 360/73
[58] Field of Search .................. 242/191, 200–203, 242/75.52; 318/7, 77, 68; 360/71, 73; 235/92 CW, 92 PB

[56] References Cited

U.S. PATENT DOCUMENTS 4,015,177 3/1977 Vaz Martins .................. 318/7
4,160,195 7/1979 Sakamoto .................. 318/7

*Primary Examiner*—Leonard D. Christian
*Attorney, Agent, or Firm*—Lowe, King, Price & Becker

[57] ABSTRACT

A tape recording and/or reproducing apparatus includes first and second motors for driving takeup and supply reels, respectively. The first motor is energized during fast forward mode to drive the takeup reel at a speed higher than the normal playback speed to feed the tape cassette from the supply reel to the takeup reel. The rotational speed of the supply reel, which is initially low and increases as a function of time, is sensed by a speed detector which develops a voltage proportional to the sensed speed. A comparator is provided to detect when the voltage reaches a predetermined value to complete a feedback control circuit to feed the voltage to the second motor. A counter torque is produced in the second motor to retard the torque produced by the first motor. By the feedback operation the supply reel is subsequently driven at a constant speed. The tape transport speed initially increases until the feedback control is effected and subsequently decreases as a function of time as the tape approaches its end to allow a tape stopping mechanism a sufficient time to operate before the tape end overruns the transducer head.

16 Claims, 2 Drawing Figures

TAPE RECORDING REPRODUCING APPARATUS HAVING IMPROVED FAST FORWARD DRIVE SYSTEM

BACKGROUND OF THE INVENTION

The present invention relates generally to cassette tape recording and/or reproducing apparatus, and in particular to a tape drive system which retards the feeding torque when the tape is nearing its trailing end during fast forward mode. The invention is particularly suitable for video tape recorders.

Conventional tape recording and reproducing devices are provided with an automatic tape stopping mechanism which senses when a transparent tape attached to one end of the magnetic tape has been paid off a supply reel as the tape is nearing its end and cuts off current supplied to a tape driving motor that drives the capstan and takeup reel. During fast forward mode, on the other hand, the tape is transported solely by a torque produced in the takeup reel and therefore the rotational speed of the supply reel increases significantly as the tape is approaching its trailing end compared with the initial speed where the full load of the tape is on the supply reel. The transparent tape has its one end secured to the hub of the supply reel to prevent it from running freely. However, a junction between the magnetic and transparent tapes presents a discontinuity which would impair a transducer head hitting it at high speed particularly where the apparatus is a video tape recorder. Therefore, the length of the transparent tape is such that the apparatus may stop before the transparent tape comes to the transducer head. Because of this length limitation the automatic stopping mechanism needs to stop the tape in a short period of time. However, a braking action of a high deceleration rate would in turn cause a breakage in the magnetic tape. This drawback could be eliminated by decreasing the amount of the feeding torque produced in the takeup reel although the tape would become slack at the instant the feeding torque is reduced.

SUMMARY OF THE INVENTION

The invention eliminates the problems by the use of a servocontrol mechanism which produces a retarding torque in the supply reel when the magnetic tape is approaching its trailing end during fast forward mode.

The tape recording and/or reproducing apparatus embodying the invention comprises a first motor for driving a takeup reel, and means for producing a torque in the first motor to feed a cassette magnetic tape from a supply reel to the takeup reel at a speed higher than the normal playing speed during fast forward mode. The tape drive system of the invention comprises a second motor for driving the supply reel, means for generating a signal representative of the speed of rotation of the supply reel, and a negative feedback circuit operable when the signal exceeds a predetermined value for supplying the signal to the second motor to produce a torque in the supply reel to retard the feeding torque produced by the first motor. Because of the servocontrol mechanism, the rotational speed of the supply reel is rendered constant and, as a result, the tape transport speed decreases as a function of time as it nears its end, allowing the tape stopping mechanism sufficient time to stop the magnetic tape before its end moves past the transducer head.

BRIEF DESCRIPTION OF THE DRAWINGS

Detailed description of the invention will follow with reference to the accompanying drawings in which.

DETAILED DESCRIPTION

Figure 1:
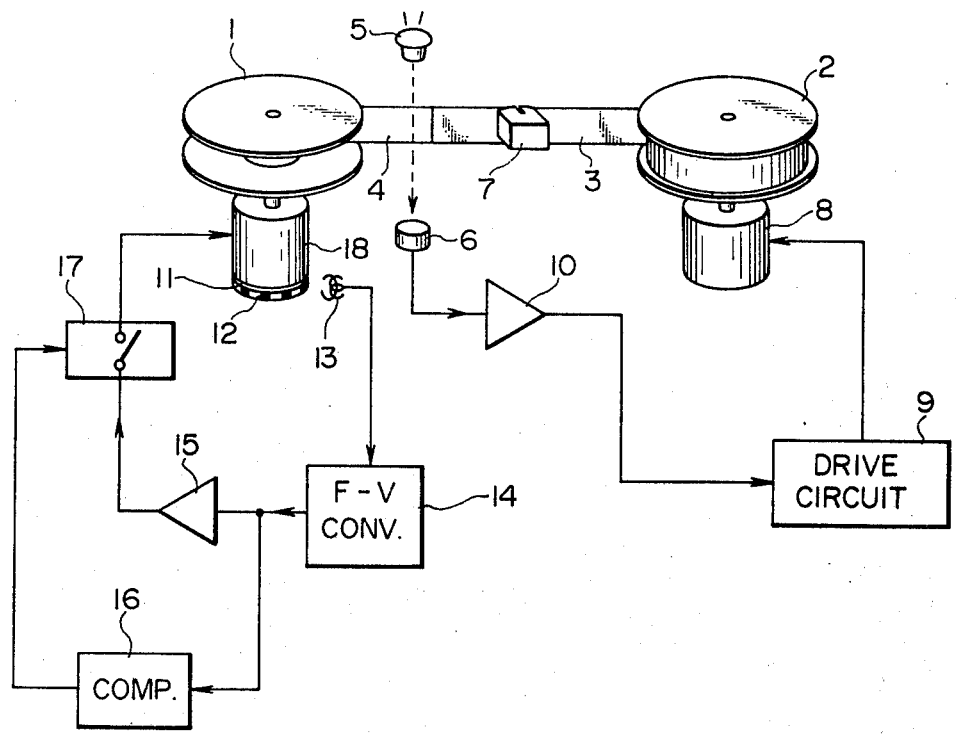
FIG. 1 is a block diagram of the tape drive system of the invention for a tape recording and reproducing apparatus operating in the fast forward mode.

FIG. 1 is a block diagram of part of a cassette tape recording and/or reproducing apparatus embodying a tape drive system of the present invention. As in conventional cassette tape recorders the tape cassette includes a supply reel 1 for feeding a magnetic tape 3 to a takeup reel 2 which is driven by a motor 8 when energized by a drive circuit 9. The drive circuit 9 is operated during fast forward mode to supply a constant current to the motor 8 to produce a torque in the takeup reel 2 so that it takes up the tape 3 in the forward direction at a speed much higher than the normal playing speed.

According to the invention the tape drive system includes a second motor 18 having a rotor connected to the rotary shaft of the supply reel 1 for rotation therewith. A wheel 11 is secured to the motor 18 for rotation therewith. The wheel 11 includes a plurality of alternately poled magnets 12 in the direction of circumference thereof. A magnetic flux sensor 13 is provided stationarily with respect to the periphery of the wheel 11 to generate electrical pulses at a frequency proportional to the speed of rotation of the supply reel 1. A frequency-to-voltage converter 14 is coupled to the flux sensor 13 to convert the pulses into a voltage signal proportional to the rotational speed of the supply reel. The frequency-to-voltage converter 14 may comprise a waveform shaping circuit for shaping the waveform of the signal from the flux sensor 13 into pulses having sharply defined binary levels and a smoothing circuit that integrates the pulses into a direct current signal.

The speed indicative voltage signal is applied through a negative feedback circuit to the second motor 18. This feedback circuit includes an amplifier 15 for amplifying the output of the converter 14 to provide an appropriate loop gain for negative feedback operation, a normally open switch 17 for supplying the amplified voltage to the motor 18 when closed and a comparator 16 which is connected to the output of the frequency-to-voltage converter 14 to detect when the voltage signal exceeds a predetermined value. When the predetermined value is exceeded the comparator 16 provides a control signal to the switch 17 to complete the feedback circuit for the motor 18. The motor 18 is energized to produce a torque which retards the feeding torque produced by the first motor 8.

Figure 2:
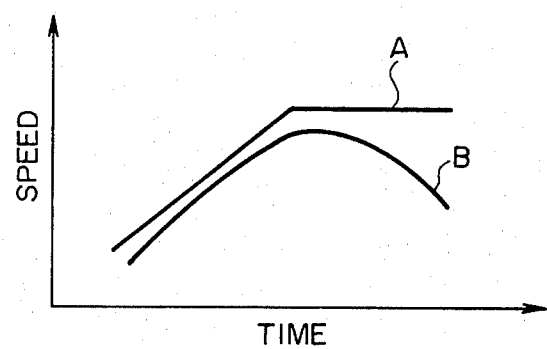
FIG. 2 is a graph of the operating characteristics of the tape drive system as a function of time from the beginning to the end of a fast forward operation.

With the supply reel 1 being loaded with a full length of tape 3, a fast forward operation initially causes the tape to move at a relatively low speed and the supply reel 1 turns at a low speed. As the fast forward operation continues the diameter of the tape wound on the takeup reel 2 increases, so that the supply reel 1 is rotated at a speed much higher than the initial speed. When the tape is nearing its trailing end, the voltage developed in the frequency-to-voltage converter 14 reaches the threshold level of the comparator 16 and the switch 17 is consequently closed. The motor 18 is thus energized and a torque is produced therein to counteract the torque produced by the first motor 8. The speed of rotation of the supply reel 1 is thus servocontrolled so that it maintains a constant value as indicated by a curve A. As a result the tape transport speed decreases as indicated by a curve B in FIG. 2.

To each of the leading and trailing ends of magnetic tape 3 is attached a transparent tape 4. This serves as an indication of an end of the tape and the fast forward mode is terminated automatically by an arrangement comprising a light source 5 for emission of a light beam to a photoelectrical sensor 6 through the transparent tape 4. The sensor 6 generates a signal which is amplified at 10 and applied to the drive circuit 9 to terminate its current supply to the first motor 8. Since the tape transport speed decreases as it nears the trailing end, there is a sufficient amount of time for the tape stopping mechanism to stop the tape before the transparent tape portion overruns the transducer head 7. Because of the retarding torque, the tape 3 is maintained taut until it is decelerated to a standstill.

The voltage applied to the motor 18 at the instant the servomechanism is switched into operation is adjusted so that the initial counter torque is insignificant compared with the feeding torque provided by the motor 8 in order to prevent the servomechanism from hunting violently.

What is claimed is:

1. A tape recording and/or reproducing apparatus comprising a first motor for driving a takeup reel for feeding a magnetic tape from a supply reel to the takeup reel, and means for producing a torque in the first motor to feed the tape at a speed higher than the normal tape playing speed, said torque producing means including:
   a second motor for driving said supply reel;
   sensor means for deriving a signal representative of the speed of rotation of said second motor while the tape is being taken up by said first motor;
   means responsive to the sensor means for detecting when the rotation speed of the second motor exceeds a predetermined value; and
   means responsive to said detecting means for supplying said signal to said second motor to generate therein a torque to counter the movement of said tape, whereby said second motor is driven at a constant speed and said tape is taken up at a speed decreasing as a function of time.

2. A tape recording and/or reproducing apparatus as claimed in claim 1, where said sensor means comprises:
   means for generating pulses at a frequency proportional to the speed of rotation of said second motor; and
   means for converting said pulses into a voltage proportional to the frequency of said pulses,
   wherein said signal supplying means comprises a normally open switch responsive to said detecting means, said switch being closed when the speed of the second motor exceeds the predetermined value to establish a circuit between said signal generating means and said second motor.

3. A tape recording and/or reproducing apparatus as claimed in claim 2, wherein said pulse generating means comprises a wheel, mounted for rotation with said second motor, having a plurality of alternately poled magnets on the circumference thereof, and means for sensing magnetic flux adjacent the circumference of said wheel to generate electrical pulses.

4. A tape recording and/or reproducing apparatus as claimed in claim 2 or 3, wherein said comparator comprises a Schmitt trigger circuit.

5. A tape drive system for a tape recording and/or reproducing apparatus, comprising a first motor for driving a takeup reel for feeding a magnetic tape from a supply reel to the takeup reel, and means for producing a torque in the first motor to feed the tape at a speed higher than the normal tape playing speed, the means for producing the torque in the first motor, comprising:
   a second motor for driving said supply reel;
   sensor means for deriving a signal representative of the speed of rotation of said second motor when the tape is being taken up by said first motor;
   means responsive to the sensor means for detecting when the speed of the second motor exceeds a predetermined value; and
   means responsive to said detecting means for supplying said signal to said second motor to generate therein a counter torque for retarding the movement of said tape, whereby said second motor is driven at a constant speed and said tape is taken up at a speed decreasing as a function of time.

6. A tape drive system as claimed in claim 5, wherein said sensor means comprises:
   means for generating pulses at a frequency proportional to the speed of rotation of said second motor; and
   means for converting said pulses into a voltage signal proportional to the frequency of said pulses,
   wherein said signal supplying means comprises a normally open switch responsive to said detecting means, said switch being closed when the speed of the second motor exceeds thhe predetermined value to establish a circuit between said signal generating means and said second motor.

7. A tape drive system as claimed in claim 6, wherein said pulse generating means comprises a wheel mounted for rotation with said second motor and having a plurality of alternately poled magnets on the circumference thereof, and means for sensing magnetic flux adjacent the circumference of said wheel to generate electrical pulses.

8. A tape drive system as claimed in claim 6 or 7, wherein said comparator comprises a Schmitt trigger circuit.

9. A tape recording and/or reproducing apparatus as claimed in claim 2, wherein said circuit includes an amplifier.

10. A tape recording and/or reproducing apparatus as claimed in claim 1, wherein said tape is provided with a transparent segment at the end thereof coupled to said supply reel, further comprising means responsive to said transparent tape when said magnetic tape has been paid off said supply reel for de-energizing said means for producing a torque in said first motor.

11. A tape drive system as claimed in claim 6, wherein said circuit includes an amplifier.

12. A tape drive system as claimed in claim 5, wherein said tape is provided with a transparent segment at the end thereof coupled to said supply reel, further comprising means responsive to said transparent segment when said magnetic tape has been paid off said supply reel for de-energizing said means for producing a torque in said first motor.

13. Apparatus for controlling the speed of motor means driving a tape between first and second reels, so the motor means speed is maintained relatively constant when the tape is driven at high speed relative to normal speed of the tape, the motor means including first and second motors for respectively driving the first and second reels, the first motor when driving the tape toward the first reel at high speed causing a torque to be produced in the second motor, the control apparatus comprising means for detecting the speed of the second motor, and means responsive to the detecting means for supplying a signal having a component proportional to the second motor speed to the second motor only in response to the second motor speed exceeding a predetermined value associated with the high tape speed, the signal having a component proportional to the second motor speed as supplied to the second motor producing a torque in the second motor opposite to the torque produced in the second motor by the first motor driving the tape at high speed.

14. Apparatus for automatically reducing the speed of tape driven at high speed from a supply reel to a take up reel as the tape approaches a fully wound condition on the take up reel, the high speed being greater than normal tape speed between the supply and take up reels, comprising a first motor for driving the take up reel at the high speed, a second motor driving the supply reel, the first motor when driving the tape toward the take up reel at high speed causing a torque to be produced in the second motor, and means for controlling the second motor to maintain the speed of the second motor substantially constant when the tape is driven at the high speed, the second motor being driven at the constant speed by the control means in a direction such that the control means produces a torque in the second motor opposite to the torque produced in the second motor by the first motor driving the tape at high speed.

15. The apparatus of claim 14 wherein the control means includes a negative feedback loop for controlling the speed of the second motor as a function of the speed of the second motor.

16. The apparatus of claim 15 wherein the negative feedback loop includes: means for detecting the speed of the second motor and means responsive to the detecting means for supplying a signal having a component proportional to the second motor speed to the second motor only when the second motor speed exceeds a predetermined value.

* * * * *